(12) United States Patent
Yang et al.

(10) Patent No.: US 10,706,391 B2
(45) Date of Patent: Jul. 7, 2020

(54) PROTECTING SCHEDULED MEETING IN PHYSICAL ROOM

(71) Applicant: Cisco Technology, Inc., San Jose, CA (US)

(72) Inventors: Mingfeng Yang, Anhui Province (CN); DeLei Xie, AnHui Province (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 274 days.

(21) Appl. No.: 15/648,529

(22) Filed: Jul. 13, 2017

(65) Prior Publication Data
US 2019/0019162 A1    Jan. 17, 2019

(51) Int. Cl.
*G06Q 10/10* (2012.01)
*H04N 7/15* (2006.01)

(52) U.S. Cl.
CPC ......... *G06Q 10/1095* (2013.01); *H04N 7/155* (2013.01)

(58) Field of Classification Search
CPC ....... G06Q 10/1095; H04N 7/152; H04N 7/15
See application file for complete search history.

(56) References Cited

U.S. PATENT DOCUMENTS

| | | | |
|---|---|---|---|
| 4,460,807 A | 7/1984 | Kerr et al. | |
| 4,890,257 A | 12/1989 | Anthias et al. | |
| 4,977,605 A | 12/1990 | Fardeau et al. | |
| 5,293,430 A | 3/1994 | Shiau et al. | |
| 5,694,563 A | 12/1997 | Belfiore et al. | |
| 5,699,082 A | 12/1997 | Marks et al. | |

(Continued)

FOREIGN PATENT DOCUMENTS

| | | |
|---|---|---|
| CN | 101055561 | 10/2007 |
| CN | 101076060 | 11/2007 |

(Continued)

OTHER PUBLICATIONS

Author Unknown, "A Primer on the H.323 Series Standard," Version 2.0, available at http://www.packetizer.com/voip/h323/papers/primer/, retrieved on Dec. 20, 2006, 17 pages.

(Continued)

*Primary Examiner* — Renae Feacher
(74) *Attorney, Agent, or Firm* — Polsinelli PC

(57) ABSTRACT

Systems and methods are disclosed for securing a meeting in a physical conference room with multiple meetings scheduled therein. A list of scheduled meetings for the physical conference room is received from a videoconference server that is configured to host a multi-endpoint conference meeting between a local endpoint associated with the physical conference room and at least one remote endpoint. A first meeting within the list of scheduled meetings is designated as a locked meeting. The list of scheduled meetings that do not have the locked designation associated with the physical conference room for display are displayed, whereas for the first meeting, display of meeting information is suppressed. The presence of a device associated with an entity invited to the first meeting is detected, and at least one resource in the physical conference room is unlocked for use in the first meeting when a received meeting identifier is verified.

18 Claims, 9 Drawing Sheets

(56) References Cited

U.S. PATENT DOCUMENTS

| | | |
|---|---|---|
| 5,745,711 A | 4/1998 | Kitahara et al. |
| 5,767,897 A | 6/1998 | Howell |
| 5,825,858 A | 10/1998 | Shaffer et al. |
| 5,874,962 A | 2/1999 | de Judicibus et al. |
| 5,889,671 A | 3/1999 | Autermann et al. |
| 5,917,537 A | 6/1999 | Lightfoot et al. |
| 5,995,096 A | 11/1999 | Kitahara et al. |
| 6,023,606 A | 2/2000 | Monte et al. |
| 6,040,817 A | 3/2000 | Sumikawa |
| 6,075,531 A | 6/2000 | DeStefano |
| 6,085,166 A | 7/2000 | Beckhardt et al. |
| 6,191,807 B1 | 2/2001 | Hamada et al. |
| 6,300,951 B1 | 10/2001 | Filetto et al. |
| 6,392,674 B1 | 5/2002 | Hiraki et al. |
| 6,424,370 B1 | 7/2002 | Courtney |
| 6,463,473 B1 | 10/2002 | Gubbi |
| 6,553,363 B1 | 4/2003 | Hoffman |
| 6,554,433 B1 | 4/2003 | Holler |
| 6,573,913 B1 | 6/2003 | Butler et al. |
| 6,646,997 B1 | 11/2003 | Baxley et al. |
| 6,665,396 B1 | 12/2003 | Khouri et al. |
| 6,700,979 B1 | 3/2004 | Washiya |
| 6,711,419 B1 | 3/2004 | Mori |
| 6,754,321 B1 | 6/2004 | Innes et al. |
| 6,754,335 B1 | 6/2004 | Shaffer et al. |
| RE38,609 E | 10/2004 | Chen et al. |
| 6,816,464 B1 | 11/2004 | Scott et al. |
| 6,865,264 B2 | 3/2005 | Berstis |
| 6,938,208 B2 | 8/2005 | Reichardt |
| 6,978,499 B2 | 12/2005 | Gallant et al. |
| 7,046,134 B2 | 5/2006 | Hansen |
| 7,046,794 B2 | 5/2006 | Piket et al. |
| 7,058,164 B1 | 6/2006 | Chan et al. |
| 7,058,710 B2 | 6/2006 | McCall et al. |
| 7,062,532 B1 | 6/2006 | Sweat et al. |
| 7,085,367 B1 | 8/2006 | Lang |
| 7,124,164 B1 | 10/2006 | Chemtob |
| 7,149,499 B1 | 12/2006 | Oran et al. |
| 7,180,993 B2 | 2/2007 | Hamilton |
| 7,209,475 B1 | 4/2007 | Shaffer et al. |
| 7,340,151 B2 | 3/2008 | Taylor et al. |
| 7,366,310 B2 | 4/2008 | Stinson et al. |
| 7,418,664 B2 | 8/2008 | Ben-Shachar et al. |
| 7,441,198 B2 | 10/2008 | Dempski et al. |
| 7,478,339 B2 | 1/2009 | Pettiross et al. |
| 7,500,200 B2 | 3/2009 | Kelso et al. |
| 7,530,022 B2 | 5/2009 | Ben-Shachar et al. |
| 7,552,177 B2 | 6/2009 | Kessen et al. |
| 7,577,711 B2 | 8/2009 | McArdle |
| 7,584,258 B2 | 9/2009 | Maresh |
| 7,587,028 B1 | 9/2009 | Broerman et al. |
| 7,606,714 B2 | 10/2009 | Williams et al. |
| 7,606,862 B2 | 10/2009 | Swearingen et al. |
| 7,620,902 B2 | 11/2009 | Manion et al. |
| 7,634,533 B2 | 12/2009 | Rudolph et al. |
| 7,774,407 B2 | 8/2010 | Daly et al. |
| 7,792,277 B2 | 9/2010 | Shaffer et al. |
| 7,830,814 B1 | 11/2010 | Allen et al. |
| 7,840,013 B2 | 11/2010 | Dedieu et al. |
| 7,840,980 B2 | 11/2010 | Gutta |
| 7,881,450 B1 | 2/2011 | Gentle et al. |
| 7,920,160 B2 | 4/2011 | Tamaru et al. |
| 7,956,869 B1 | 6/2011 | Gilra |
| 7,986,372 B2 | 7/2011 | Ma et al. |
| 7,995,464 B1 | 8/2011 | Croak et al. |
| 8,059,557 B1 | 11/2011 | Sigg et al. |
| 8,081,205 B2 | 12/2011 | Baird et al. |
| 8,140,973 B2 | 3/2012 | Sandquist et al. |
| 8,169,463 B2 | 5/2012 | Enstad et al. |
| 8,219,624 B2 | 7/2012 | Haynes et al. |
| 8,274,893 B2 | 9/2012 | Bansal et al. |
| 8,290,998 B2 | 10/2012 | Stienhans et al. |
| 8,301,883 B2 | 10/2012 | Sundaram et al. |
| 8,340,268 B2 | 12/2012 | Knaz |
| 8,358,327 B2 | 1/2013 | Duddy |
| 8,423,615 B1 | 4/2013 | Hayes |
| 8,428,234 B2 | 4/2013 | Knaz |
| 8,433,061 B2 | 4/2013 | Cutler |
| 8,434,019 B2 | 4/2013 | Nelson |
| 8,456,507 B1 | 6/2013 | Mallappa et al. |
| 8,462,103 B1 | 6/2013 | Moscovitch et al. |
| 8,478,848 B2 | 7/2013 | Minert |
| 8,520,370 B2 | 8/2013 | Waitzman, III et al. |
| 8,625,749 B2 | 1/2014 | Jain et al. |
| 8,630,208 B1 | 1/2014 | Kjeldaas |
| 8,638,354 B2 | 1/2014 | Leow et al. |
| 8,645,464 B2 | 2/2014 | Zimmet et al. |
| 8,675,847 B2 | 3/2014 | Shaffer et al. |
| 8,694,587 B2 | 4/2014 | Chaturvedi et al. |
| 8,694,593 B1 | 4/2014 | Wren et al. |
| 8,706,539 B1 | 4/2014 | Mohler |
| 8,732,149 B2 | 5/2014 | Lida et al. |
| 8,738,080 B2 | 5/2014 | Nhiayi et al. |
| 8,751,572 B1 | 6/2014 | Behforooz et al. |
| 8,831,505 B1 | 9/2014 | Seshadri |
| 8,850,203 B2 | 9/2014 | Sundaram et al. |
| 8,860,774 B1 | 10/2014 | Sheeley et al. |
| 8,874,644 B2 | 10/2014 | Allen et al. |
| 8,890,924 B2 | 11/2014 | Wu |
| 8,892,646 B2 | 11/2014 | Chaturvedi et al. |
| 8,914,444 B2 | 12/2014 | Hladik, Jr. |
| 8,914,472 B1 | 12/2014 | Lee et al. |
| 8,924,862 B1 | 12/2014 | Luo |
| 8,930,840 B1 | 1/2015 | Riskó et al. |
| 8,947,493 B2 | 2/2015 | Lian et al. |
| 8,972,494 B2 | 3/2015 | Chen et al. |
| 9,003,445 B1 | 4/2015 | Rowe |
| 9,031,839 B2 | 5/2015 | Thorsen et al. |
| 9,032,028 B2 | 5/2015 | Davidson et al. |
| 9,075,572 B2 | 7/2015 | Ayoub et al. |
| 9,118,612 B2 | 8/2015 | Fish et al. |
| 9,131,017 B2 | 9/2015 | Kurupacheril et al. |
| 9,137,376 B1 | 9/2015 | Basart et al. |
| 9,143,729 B2 | 9/2015 | Anand et al. |
| 9,165,281 B2 | 10/2015 | Orsolini et al. |
| 9,197,701 B1 | 11/2015 | Petrov et al. |
| 9,197,848 B2 | 11/2015 | Felkai et al. |
| 9,201,527 B2 | 12/2015 | Kripalani et al. |
| 9,204,099 B2 | 12/2015 | Brown |
| 9,219,735 B2 | 12/2015 | Hoard et al. |
| 9,246,855 B2 | 1/2016 | Maehiro |
| 9,258,033 B2 | 2/2016 | Showering |
| 9,268,398 B2 | 2/2016 | Tipirneni |
| 9,298,342 B2 | 3/2016 | Zhang et al. |
| 9,323,417 B2 | 4/2016 | Sun et al. |
| 9,335,892 B2 | 5/2016 | Ubillos |
| 9,349,119 B2 | 5/2016 | Desai et al. |
| 9,367,224 B2 | 6/2016 | Ananthakrishnan et al. |
| 9,369,673 B2 | 6/2016 | Ma et al. |
| 9,407,621 B2 | 8/2016 | Vakil et al. |
| 9,432,512 B2 | 8/2016 | You |
| 9,449,303 B2 | 9/2016 | Underhill et al. |
| 9,495,664 B2 | 11/2016 | Cole et al. |
| 9,513,861 B2 | 12/2016 | Lin et al. |
| 9,516,022 B2 | 12/2016 | Borzycki et al. |
| 9,525,711 B2 | 12/2016 | Ackerman et al. |
| 9,553,799 B2 | 1/2017 | Tarricone et al. |
| 9,563,480 B2 | 2/2017 | Messerli et al. |
| 9,609,030 B2 | 3/2017 | Sun et al. |
| 9,609,514 B2 | 3/2017 | Mistry et al. |
| 9,614,756 B2 | 4/2017 | Joshi |
| 9,640,194 B1 | 5/2017 | Nemala et al. |
| 9,667,799 B2 | 5/2017 | Olivier et al. |
| 9,674,625 B2 | 6/2017 | Armstrong-Mutner |
| 9,762,709 B1 | 9/2017 | Snyder et al. |
| 2001/0030661 A1 | 10/2001 | Reichardt |
| 2002/0018051 A1 | 2/2002 | Singh |
| 2002/0076003 A1 | 6/2002 | Zellner et al. |
| 2002/0078153 A1 | 6/2002 | Chung et al. |
| 2002/0140736 A1 | 10/2002 | Chen |
| 2002/0188522 A1 | 12/2002 | McCall et al. |
| 2003/0028647 A1 | 2/2003 | Grosu |
| 2003/0046421 A1 | 3/2003 | Horvitz et al. |
| 2003/0068087 A1 | 4/2003 | Wu et al. |

(56) References Cited

U.S. PATENT DOCUMENTS

| | | |
|---|---|---|
| 2003/0154250 A1 | 8/2003 | Miyashita |
| 2003/0174826 A1 | 9/2003 | Hesse |
| 2003/0187800 A1 | 10/2003 | Moore et al. |
| 2003/0197739 A1 | 10/2003 | Bauer |
| 2003/0227423 A1 | 12/2003 | Arai et al. |
| 2004/0039909 A1 | 2/2004 | Cheng |
| 2004/0054885 A1 | 3/2004 | Bartram et al. |
| 2004/0098456 A1 | 5/2004 | Krzyzanowski et al. |
| 2004/0210637 A1 | 10/2004 | Loveland |
| 2004/0253991 A1 | 12/2004 | Azuma |
| 2004/0267938 A1 | 12/2004 | Shoroff et al. |
| 2005/0014490 A1 | 1/2005 | Desai et al. |
| 2005/0031136 A1 | 2/2005 | Du et al. |
| 2005/0048916 A1 | 3/2005 | Suh |
| 2005/0055405 A1 | 3/2005 | Kaminsky et al. |
| 2005/0055412 A1 | 3/2005 | Kaminsky et al. |
| 2005/0085243 A1 | 4/2005 | Boyer et al. |
| 2005/0099492 A1 | 5/2005 | Orr |
| 2005/0108328 A1 | 5/2005 | Berkeland et al. |
| 2005/0131774 A1 | 6/2005 | Huxter |
| 2005/0175208 A1 | 8/2005 | Shaw et al. |
| 2005/0215229 A1 | 9/2005 | Cheng |
| 2005/0226511 A1 | 10/2005 | Short |
| 2005/0231588 A1 | 10/2005 | Yang et al. |
| 2005/0286711 A1 | 12/2005 | Lee et al. |
| 2006/0004911 A1 | 1/2006 | Becker et al. |
| 2006/0020697 A1 | 1/2006 | Kelso et al. |
| 2006/0026255 A1 | 2/2006 | Malamud et al. |
| 2006/0083305 A1 | 4/2006 | Dougherty et al. |
| 2006/0084471 A1 | 4/2006 | Walter |
| 2006/0164552 A1 | 7/2006 | Cutler |
| 2006/0224430 A1 | 10/2006 | Butt |
| 2006/0250987 A1 | 11/2006 | White et al. |
| 2006/0271624 A1 | 11/2006 | Lyle et al. |
| 2007/0005752 A1 | 1/2007 | Chawla et al. |
| 2007/0021973 A1 | 1/2007 | Stremler |
| 2007/0025576 A1 | 2/2007 | Wen |
| 2007/0041366 A1 | 2/2007 | Vugenfirer et al. |
| 2007/0047707 A1 | 3/2007 | Mayer et al. |
| 2007/0058842 A1 | 3/2007 | Vallone et al. |
| 2007/0067387 A1 | 3/2007 | Jain et al. |
| 2007/0091831 A1 | 4/2007 | Croy et al. |
| 2007/0100986 A1 | 5/2007 | Bagley et al. |
| 2007/0106747 A1 | 5/2007 | Singh et al. |
| 2007/0116225 A1 | 5/2007 | Zhao et al. |
| 2007/0139626 A1 | 6/2007 | Saleh et al. |
| 2007/0150453 A1 | 6/2007 | Morita |
| 2007/0168444 A1 | 7/2007 | Chen et al. |
| 2007/0198637 A1 | 8/2007 | Deboy et al. |
| 2007/0208590 A1 | 9/2007 | Dorricott et al. |
| 2007/0248244 A1 | 10/2007 | Sato et al. |
| 2007/0250567 A1 | 10/2007 | Graham et al. |
| 2008/0059986 A1 | 3/2008 | Kalinowski et al. |
| 2008/0068447 A1 | 3/2008 | Mattila et al. |
| 2008/0071868 A1 | 3/2008 | Arenburg et al. |
| 2008/0080532 A1 | 4/2008 | O'Sullivan et al. |
| 2008/0107255 A1 | 5/2008 | Geva et al. |
| 2008/0133663 A1 | 6/2008 | Lentz |
| 2008/0154863 A1 | 6/2008 | Goldstein |
| 2008/0209452 A1 | 8/2008 | Ebert et al. |
| 2008/0256182 A1* | 10/2008 | Sekaran ............... H04L 12/1822 709/204 |
| 2008/0270211 A1 | 10/2008 | Vander Veen et al. |
| 2008/0278894 A1 | 11/2008 | Chen et al. |
| 2009/0012963 A1 | 1/2009 | Johnson et al. |
| 2009/0019374 A1 | 1/2009 | Logan et al. |
| 2009/0049151 A1 | 2/2009 | Pagan |
| 2009/0064245 A1 | 3/2009 | Facemire et al. |
| 2009/0075633 A1 | 3/2009 | Lee et al. |
| 2009/0089822 A1 | 4/2009 | Wada |
| 2009/0094088 A1 | 4/2009 | Chen et al. |
| 2009/0100142 A1 | 4/2009 | Stern et al. |
| 2009/0119373 A1 | 5/2009 | Denner et al. |
| 2009/0132949 A1 | 5/2009 | Bosarge |
| 2009/0193327 A1 | 7/2009 | Roychoudhuri et al. |
| 2009/0234667 A1 | 9/2009 | Thayne |
| 2009/0254619 A1 | 10/2009 | Kho et al. |
| 2009/0256901 A1 | 10/2009 | Mauchly et al. |
| 2009/0278851 A1 | 11/2009 | Ach et al. |
| 2009/0282104 A1 | 11/2009 | O'Sullivan et al. |
| 2009/0292999 A1 | 11/2009 | LaBine et al. |
| 2009/0296908 A1 | 12/2009 | Lee et al. |
| 2009/0306981 A1 | 12/2009 | Cromack et al. |
| 2009/0309846 A1 | 12/2009 | Trachtenberg et al. |
| 2009/0313334 A1 | 12/2009 | Seacat et al. |
| 2010/0005142 A1 | 1/2010 | Xiao et al. |
| 2010/0005402 A1 | 1/2010 | George et al. |
| 2010/0031192 A1 | 2/2010 | Kong |
| 2010/0061538 A1 | 3/2010 | Coleman et al. |
| 2010/0070640 A1 | 3/2010 | Allen, Jr. et al. |
| 2010/0073454 A1 | 3/2010 | Lovhaugen et al. |
| 2010/0077109 A1 | 3/2010 | Yan et al. |
| 2010/0094867 A1 | 4/2010 | Badros et al. |
| 2010/0095327 A1 | 4/2010 | Fujinaka et al. |
| 2010/0121959 A1 | 5/2010 | Lin et al. |
| 2010/0131856 A1 | 5/2010 | Kalbfleisch et al. |
| 2010/0157978 A1 | 6/2010 | Robbins et al. |
| 2010/0162170 A1 | 6/2010 | Johns et al. |
| 2010/0183179 A1 | 7/2010 | Griffin, Jr. et al. |
| 2010/0211872 A1 | 8/2010 | Rolston et al. |
| 2010/0215334 A1 | 8/2010 | Miyagi |
| 2010/0220615 A1 | 9/2010 | Enstrom et al. |
| 2010/0241691 A1 | 9/2010 | Savitzky et al. |
| 2010/0245535 A1 | 9/2010 | Mauchly |
| 2010/0250817 A1 | 9/2010 | Collopy et al. |
| 2010/0262266 A1 | 10/2010 | Chang et al. |
| 2010/0262925 A1 | 10/2010 | Liu et al. |
| 2010/0275164 A1 | 10/2010 | Morikawa |
| 2010/0302033 A1 | 12/2010 | Devenyi et al. |
| 2010/0303227 A1 | 12/2010 | Gupta |
| 2010/0316207 A1 | 12/2010 | Brunson |
| 2010/0318399 A1 | 12/2010 | Li et al. |
| 2011/0072037 A1 | 3/2011 | Lotzer |
| 2011/0075830 A1 | 3/2011 | Dreher et al. |
| 2011/0087745 A1 | 4/2011 | O'Sullivan et al. |
| 2011/0117535 A1 | 5/2011 | Benko et al. |
| 2011/0131498 A1 | 6/2011 | Chao et al. |
| 2011/0154427 A1 | 6/2011 | Wei |
| 2011/0230209 A1 | 9/2011 | Kilian |
| 2011/0264928 A1 | 10/2011 | Hinckley |
| 2011/0270609 A1 | 11/2011 | Jones et al. |
| 2011/0271211 A1 | 11/2011 | Jones et al. |
| 2011/0283226 A1 | 11/2011 | Basson et al. |
| 2011/0314139 A1 | 12/2011 | Song et al. |
| 2012/0009890 A1 | 1/2012 | Curcio et al. |
| 2012/0013704 A1 | 1/2012 | Sawayanagi et al. |
| 2012/0013768 A1 | 1/2012 | Zurek et al. |
| 2012/0026279 A1 | 2/2012 | Kato |
| 2012/0054288 A1 | 3/2012 | Wiese et al. |
| 2012/0072364 A1 | 3/2012 | Ho |
| 2012/0084714 A1 | 4/2012 | Sirpal et al. |
| 2012/0092436 A1 | 4/2012 | Pahud et al. |
| 2012/0140970 A1 | 6/2012 | Kim et al. |
| 2012/0150956 A1* | 6/2012 | Tucker ............... H04L 65/1069 709/204 |
| 2012/0179502 A1 | 7/2012 | Farooq et al. |
| 2012/0185291 A1* | 7/2012 | Ramaswamy ...... H04L 12/1818 705/7.19 |
| 2012/0190386 A1 | 7/2012 | Anderson |
| 2012/0192075 A1 | 7/2012 | Ebtekar et al. |
| 2012/0233020 A1 | 9/2012 | Eberstadt et al. |
| 2012/0246229 A1 | 9/2012 | Carr et al. |
| 2012/0246596 A1 | 9/2012 | Ording et al. |
| 2012/0284635 A1 | 11/2012 | Sitrick et al. |
| 2012/0296957 A1 | 11/2012 | Stinson et al. |
| 2012/0303476 A1 | 11/2012 | Krzyzanowski et al. |
| 2012/0306757 A1 | 12/2012 | Keist et al. |
| 2012/0306993 A1 | 12/2012 | Sellers-Blais |
| 2012/0308202 A1 | 12/2012 | Murata et al. |
| 2012/0313971 A1 | 12/2012 | Murata et al. |
| 2012/0315011 A1 | 12/2012 | Messmer et al. |
| 2012/0321058 A1 | 12/2012 | Eng et al. |
| 2012/0323645 A1 | 12/2012 | Spiegel et al. |
| 2012/0324512 A1 | 12/2012 | Cahnbley et al. |

(56) References Cited

U.S. PATENT DOCUMENTS

| | | |
|---|---|---|
| 2013/0027425 A1 | 1/2013 | Yuan |
| 2013/0038675 A1 | 2/2013 | Malik |
| 2013/0047093 A1 | 2/2013 | Reuschel et al. |
| 2013/0050398 A1 | 2/2013 | Krans et al. |
| 2013/0055112 A1 | 2/2013 | Joseph et al. |
| 2013/0061054 A1 | 3/2013 | Niccolai |
| 2013/0063542 A1 | 3/2013 | Bhat et al. |
| 2013/0086633 A1 | 4/2013 | Schultz |
| 2013/0090065 A1 | 4/2013 | Fisunenko et al. |
| 2013/0091205 A1 | 4/2013 | Kotler et al. |
| 2013/0091440 A1 | 4/2013 | Kotler et al. |
| 2013/0094647 A1 | 4/2013 | Mauro et al. |
| 2013/0113602 A1 | 5/2013 | Gilbertson et al. |
| 2013/0113827 A1 | 5/2013 | Forutanpour et al. |
| 2013/0120522 A1 | 5/2013 | Lian et al. |
| 2013/0124551 A1 | 5/2013 | Foo |
| 2013/0129252 A1 | 5/2013 | Lauper et al. |
| 2013/0135837 A1 | 5/2013 | Kemppinen |
| 2013/0141371 A1 | 6/2013 | Hallford et al. |
| 2013/0148789 A1 | 6/2013 | Hillier et al. |
| 2013/0182063 A1 | 7/2013 | Jaiswal et al. |
| 2013/0185672 A1 | 7/2013 | McCormick et al. |
| 2013/0198629 A1 | 8/2013 | Tandon et al. |
| 2013/0210496 A1 | 8/2013 | Zakarias et al. |
| 2013/0211826 A1 | 8/2013 | Mannby |
| 2013/0212202 A1 | 8/2013 | Lee |
| 2013/0215215 A1 | 8/2013 | Gage et al. |
| 2013/0219278 A1 | 8/2013 | Rosenberg |
| 2013/0222246 A1 | 8/2013 | Booms et al. |
| 2013/0225080 A1 | 8/2013 | Doss et al. |
| 2013/0227433 A1 | 8/2013 | Doray et al. |
| 2013/0235866 A1 | 9/2013 | Tian et al. |
| 2013/0242030 A1 | 9/2013 | Kato et al. |
| 2013/0243213 A1 | 9/2013 | Moquin |
| 2013/0252669 A1 | 9/2013 | Nhiayi |
| 2013/0263020 A1 | 10/2013 | Heiferman et al. |
| 2013/0290421 A1 | 10/2013 | Benson et al. |
| 2013/0297704 A1 | 11/2013 | Alberth, Jr. et al. |
| 2013/0300637 A1 | 11/2013 | Smits et al. |
| 2013/0325970 A1 | 12/2013 | Roberts et al. |
| 2013/0329865 A1 | 12/2013 | Ristock et al. |
| 2013/0335507 A1 | 12/2013 | Aarrestad et al. |
| 2014/0012990 A1 | 1/2014 | Ko |
| 2014/0028781 A1 | 1/2014 | MacDonald |
| 2014/0040404 A1 | 2/2014 | Pujare Sanjay et al. |
| 2014/0040819 A1 | 2/2014 | Duffy |
| 2014/0063174 A1 | 3/2014 | Junuzovic et al. |
| 2014/0068452 A1 | 3/2014 | Joseph et al. |
| 2014/0068670 A1 | 3/2014 | Timmermann et al. |
| 2014/0078182 A1 | 3/2014 | Utsunomiya |
| 2014/0108486 A1 | 4/2014 | Borzycki et al. |
| 2014/0111597 A1 | 4/2014 | Anderson et al. |
| 2014/0136630 A1 | 5/2014 | Siegel et al. |
| 2014/0157338 A1 | 6/2014 | Pearce |
| 2014/0161243 A1 | 6/2014 | Contreras et al. |
| 2014/0192138 A1* | 7/2014 | Kenoyer ............ H04L 29/06027 348/14.07 |
| 2014/0195557 A1 | 7/2014 | Oztaskent et al. |
| 2014/0198175 A1 | 7/2014 | Shaffer et al. |
| 2014/0222907 A1* | 8/2014 | Seligmann .......... H04L 65/1069 709/204 |
| 2014/0237371 A1 | 8/2014 | Klemm et al. |
| 2014/0253671 A1 | 9/2014 | Bentley et al. |
| 2014/0280595 A1 | 9/2014 | Mani et al. |
| 2014/0282213 A1 | 9/2014 | Musa et al. |
| 2014/0296112 A1 | 10/2014 | O'Driscoll et al. |
| 2014/0298210 A1 | 10/2014 | Park et al. |
| 2014/0317561 A1 | 10/2014 | Robinson et al. |
| 2014/0337840 A1 | 11/2014 | Hyde et al. |
| 2014/0351327 A1 | 11/2014 | Huang et al. |
| 2014/0358264 A1 | 12/2014 | Long et al. |
| 2014/0372908 A1 | 12/2014 | Kashi et al. |
| 2015/0004571 A1 | 1/2015 | Ironside et al. |
| 2015/0009278 A1 | 1/2015 | Modai et al. |
| 2015/0029301 A1 | 1/2015 | Nakatomi et al. |
| 2015/0067552 A1 | 3/2015 | Leorin et al. |
| 2015/0070835 A1 | 3/2015 | McLean |
| 2015/0074189 A1 | 3/2015 | Cox et al. |
| 2015/0081885 A1 | 3/2015 | Thomas et al. |
| 2015/0082350 A1 | 3/2015 | Ogasawara et al. |
| 2015/0085060 A1 | 3/2015 | Fish et al. |
| 2015/0088575 A1 | 3/2015 | Asli et al. |
| 2015/0089393 A1 | 3/2015 | Zhang et al. |
| 2015/0089394 A1 | 3/2015 | Chen et al. |
| 2015/0113050 A1 | 4/2015 | Stahl |
| 2015/0113369 A1 | 4/2015 | Chan et al. |
| 2015/0128068 A1 | 5/2015 | Kim |
| 2015/0172120 A1 | 6/2015 | Dwarampudi et al. |
| 2015/0178626 A1 | 6/2015 | Pielot et al. |
| 2015/0215365 A1 | 7/2015 | Shaffer et al. |
| 2015/0215580 A1* | 7/2015 | Leske ...................... H04N 7/15 348/14.08 |
| 2015/0254760 A1 | 9/2015 | Pepper |
| 2015/0288774 A1 | 10/2015 | Larabie-Belanger |
| 2015/0301691 A1 | 10/2015 | Qin |
| 2015/0304120 A1 | 10/2015 | Xiao et al. |
| 2015/0304366 A1 | 10/2015 | Bader-Natal et al. |
| 2015/0319113 A1 | 11/2015 | Gunderson et al. |
| 2015/0350126 A1 | 12/2015 | Xue |
| 2015/0373063 A1 | 12/2015 | Vashishtha et al. |
| 2015/0373414 A1 | 12/2015 | Kinoshita |
| 2016/0037304 A1 | 2/2016 | Dunkin et al. |
| 2016/0043986 A1 | 2/2016 | Ronkainen |
| 2016/0044159 A1 | 2/2016 | Wolff et al. |
| 2016/0044380 A1 | 2/2016 | Barrett |
| 2016/0050079 A1 | 2/2016 | Martin De Nicolas et al. |
| 2016/0050160 A1 | 2/2016 | Li et al. |
| 2016/0050175 A1 | 2/2016 | Chaudhry et al. |
| 2016/0070758 A1 | 3/2016 | Thomson et al. |
| 2016/0071056 A1 | 3/2016 | Ellison et al. |
| 2016/0072862 A1 | 3/2016 | Bader-Natal et al. |
| 2016/0094593 A1 | 3/2016 | Priya |
| 2016/0105345 A1 | 4/2016 | Kim et al. |
| 2016/0110056 A1 | 4/2016 | Hong et al. |
| 2016/0165056 A1 | 6/2016 | Bargetzi et al. |
| 2016/0173537 A1 | 6/2016 | Kumar et al. |
| 2016/0182580 A1 | 6/2016 | Nayak |
| 2016/0266609 A1 | 9/2016 | McCracken |
| 2016/0269411 A1 | 9/2016 | Malachi |
| 2016/0277461 A1 | 9/2016 | Sun et al. |
| 2016/0283909 A1 | 9/2016 | Adiga |
| 2016/0284140 A1* | 9/2016 | Klein ................ G07C 9/00896 |
| 2016/0307165 A1* | 10/2016 | Grodum ................... H04N 7/15 |
| 2016/0309037 A1 | 10/2016 | Rosenberg et al. |
| 2016/0321347 A1 | 11/2016 | Zhou et al. |
| 2017/0006162 A1 | 1/2017 | Bargetzi et al. |
| 2017/0006446 A1 | 1/2017 | Harris et al. |
| 2017/0070706 A1 | 3/2017 | Ursin et al. |
| 2017/0093874 A1 | 3/2017 | Uthe |
| 2017/0104961 A1 | 4/2017 | Pan et al. |
| 2017/0171260 A1 | 6/2017 | Jerrard-Dunne et al. |
| 2017/0324850 A1 | 11/2017 | Snyder et al. |

FOREIGN PATENT DOCUMENTS

| | | |
|---|---|---|
| CN | 102572370 | 7/2012 |
| CN | 102655583 | 9/2012 |
| CN | 101729528 | 11/2012 |
| CN | 102938834 | 2/2013 |
| CN | 103141086 | 6/2013 |
| CN | 204331453 | 5/2015 |
| DE | 3843033 | 9/1991 |
| EP | 959585 | 11/1999 |
| EP | 2773131 | 9/2014 |
| EP | 2341686 | 8/2016 |
| WO | WO 98/55903 | 12/1998 |
| WO | WO 2008/139269 | 11/2008 |

(56) References Cited

FOREIGN PATENT DOCUMENTS

| WO | WO 2012/167262 | 12/2012 |
|---|---|---|
| WO | WO 2014/118736 | 8/2014 |

OTHER PUBLICATIONS

Author Unknown, ""I can see the future" 10 predictions concerning cell-phones," Surveillance Camera Players, http://www.notbored.org/cell-phones.html, Jun. 21, 2003, 2 pages.
Author Unknown, "Active screen follows mouse and dual monitors," KDE Community Forums, Apr. 13, 2010, 3 pages.
Author Unknown, "Implementing Media Gateway Control Protocols" A RADVision White Paper, Jan. 27, 2002, 16 pages.
Author Unknown, "Manage Meeting Rooms in Real Time," Jan. 23, 2017, door-tablet.com, 7 pages.
AVERUSA, "Interactive Video Conferencing K-12 applications," "Interactive Video Conferencing K-12 applications" copyright 2012. http://www.averusa.com/education/downloads/hvc brochure goved.pdf (last accessed Oct. 11, 2013).
Cisco Systems, Inc., "Cisco WebEx Meetings Server System Requirements release 1.5." 30 pages, Aug. 14, 2013.
Cisco White Paper, "Web Conferencing: Unleash the Power of Secure, Real-Time Collaboration," pp. 1-8, 2014.
Clarke, Brant, "Polycom Announces RealPresence RealPresence Group Series" "Polycom Announces RealPresence Group Series" dated Oct. 8, 2012 available at http://www.323.tv/news/polycom-realpresence-group-series (last accessed Oct. 11, 2013).
Clauser, Grant, et al., "Is the Google Home the voice-controlled speaker for you?," The Wire Cutter, Nov. 22, 2016, pp. 1-15.
Cole, Camille, et al., "Videoconferencing for K-12 Classrooms," Second Edition (excerpt), http://www.iste.org/docs/excerpts/VIDCO2-excerpt.pdf (last accessed Oct. 11, 2013), 2009.
Epson, "BrightLink Pro Projector," BrightLink Pro Projector. http://www.epson.com/cgi-bin/Store/jsp/Landing/brightlink-pro-interactive-projectors.do?ref=van brightlink pro—dated 2013 (last accessed Oct. 11, 2013).
INFOCUS, "Mondopad," Mondopad. http://www.infocus.com/sites/default/files/InFocus-Mondopad-INF5520a-INF7021-Datasheet-EN-pdf (last accessed Oct. 11, 2013), 2013.
Maccormick, John, "Video Chat with Multiple Cameras," CSCW '13, Proceedings of the 2013 conference on Computer supported cooperative work companion, pp. 195-198, ACM, New York, NY, USA, 2013.
Microsoft, "Positioning Objects on Multiple Display Monitors," Aug. 12, 2012, 2 pages.
Mullins, Robert, "Polycom Adds Tablet Videoconferencing," Mullins, R. "Polycom Adds Tablet Videoconferencing" available at http://www.informationweek.com/telecom/unified-communications/polycom/adds/tablet/videoconferencing/231900660 dated Oct. 12, 2011 (last accessed Oct. 11, 2013).
Nu-Star Technologies, "Interactive Whiteboard Conferencing," Interactive Whiteboard Conferencing. http://www.nu-star.com/interactive-conf.php dated 2013 (last accessed Oct. 11, 2013).
Polycom, "Polycom RealPresence Mobile: Mobile Telepresence & Video Conferencing," http://www.polycom.com/products-services/hd-telepresence-video-conferencing/realpresence-mobile.html#stab1 (last accessed Oct. 11, 2013), 2013.
Polycom, "Polycom Turns Video Display Screens into Virtual Whiteboards Whiteboard Solution for Video Collaboration," Polycom Turns Video Display Whiteboards with First Integrated Whiteboard Solution for Video Collaboration—http://www.polycom.com/company/news/press-releases/2011/20111027 2.html—dated Oct. 27, 2011.
Polycom, "Polycom UC Board, Transforming ordinary surfaces into virtual whiteboards" Inc., San Jose, CA, http://www.uatg.com/pdf/polycom/polycom-uc-board-datasheet.pdf, (last accessed Oct. 11, 2013).
Stevenson, Nancy, "Webex Web Meetings for Dummies" 2005, Wiley Publishing Inc., Indianapolis, Indiana, USA, 339 pages.
Stodle. Daniel, et al., "Gesture-Based, Touch-Free Multi-User Gaming on Wall-Sized, High-Resolution Tiled Displays," 2008, 13 pages.
Thompson, Phil, et al., "Agent Based Ontology Driven Virtual Meeting Assistant," Future Generation Information Technology, Springer Berlin Heidelberg, 2010, 4 pages.
TNO, "Multi-Touch Interaction Overview," Dec. 1, 2009, 12 pages.
Toga, James, et al., "Demystifying Multimedia Conferencing Over the Internet Using the H.323 Set of Standards," Intel Technology Journal Q2, 1998, 11 pages.
Ubuntu, "Force Unity to open new window on the screen where the cursor is?" Sep. 16, 2013, 1 page.
VB Forums, "Pointapi," Aug. 8, 2001, 3 pages.
Vidyo, "VidyoPanorama," VidyoPanorama—http://www.vidyo.com/products/vidyopanorama/ dated 2013 (last accessed Oct. 11, 2013).
Choi, Jae Young, et al; "Towards an Automatic Face Indexing System for Actor-based Video Services in an IPTV Environment," IEEE Transactions on 56, No. 1 (2010): 147-155.
Cisco Systems, Inc. "Cisco webex: WebEx Meeting Center User Guide for Hosts, Presenters, and Participants" © 1997-2013, pp. 1-394 plus table of contents.
Cisco Systems, Inc., "Cisco Webex Meetings for iPad and iPhone Release Notes," Version 5.0, Oct. 2013, 5 pages.
Cisco Systems, Inc., "Cisco Unified Personal Communicator 8.5", 2011, 9 pages.
Eichen, Elliot, et al., "Smartphone Docking Stations and Strongly Converged VoIP Clients for Fixed-Mobile convergence," IEEE Wireless Communications and Networking Conference: Services, Applications and Business, 2012, pp. 3140-3144.
Grothaus, Michael, "How Interactive Product Placements Could Save Television," Jul. 25, 2013, 4 pages.
Hannigan, Nancy Kruse, et al., The IBM Lotus Samteime VB Family Extending The IBM Communications and Collaboration Strategy (2007), available at http://www.ibm.com/developerworks/lotus/library/sametime8-new/, 10 pages.
Hirschmann, Kenny, "TWIDDLA: Smarter Than the Average Whiteboard," Apr. 17, 2014, 2 pages.
Nyamgondalu, Nagendra, "Lotus Notes Calendar and Scheduling Explained!" IBM, Oct. 18, 2004, 10 pages.
Schreiber, Danny, "The Missing Guide for Google Hangout Video Calls," Jun. 5, 2014, 6 pages.
Shervington, Martin, "Complete Guide to Google Hangouts for Businesses and Individuals," Mar. 20, 2014, 15 pages.
Shi, Saiqi, et al, "Notification That a Mobile Meeting Attendee Is Driving", May 20, 2013, 13 pages.

\* cited by examiner

Control Panel Display 300

310

320

| Meeting Title | Time |
|---|---|
| Meeting 1: Engine Op. Biweekly Team | 7:00AM – 8:30AM |
| Meeting 2: Holodeck Board | 8:30AM – 9:00AM |
| Meeting 5: Warp Callibration Group | 3:45PM – 4:30PM |

FIG. 3

PROTECTING SCHEDULED MEETING IN PHYSICAL ROOM

TECHNICAL FIELD

The present disclosure pertains to a conferencing system, and more specifically to use of a video conferencing system having multiple conference room endpoints and at least one control panel that is communicatively coupled to a conference room endpoint.

BACKGROUND

Multi-endpoint videoconferencing allows participants from multiple locations to collaborate in a meeting. For example, participants from multiple geographic locations can join a meeting and communicate with each other to discuss issues, share ideas, etc. These collaborative meetings often include a videoconference system with two-way audio-video transmissions. Thus, virtual meetings using a videoconference system can simulate in-person interactions between people.

Meetings are often scheduled in advance, and scheduling information for that meeting can be displayed on a control panel (e.g., a wall panel located outside a conference room reserved for the meeting). The control panel can also take in user input that initiates a scheduled meeting. However, this leaves the meeting unsecured, such that anyone with access to the control panel can initiate a meeting. Meetings can be started by accident. Moreover, some meetings may be so confidential and/or sensitive that the host or participants would prefer that meeting information is not displayed on the control panel. Thus, there is a need to secure meetings from information leaks or unexpected operations.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 3 shows an example display for displaying a list of scheduled meetings;

DESCRIPTION OF EXAMPLE EMBODIMENTS

Figure 1:
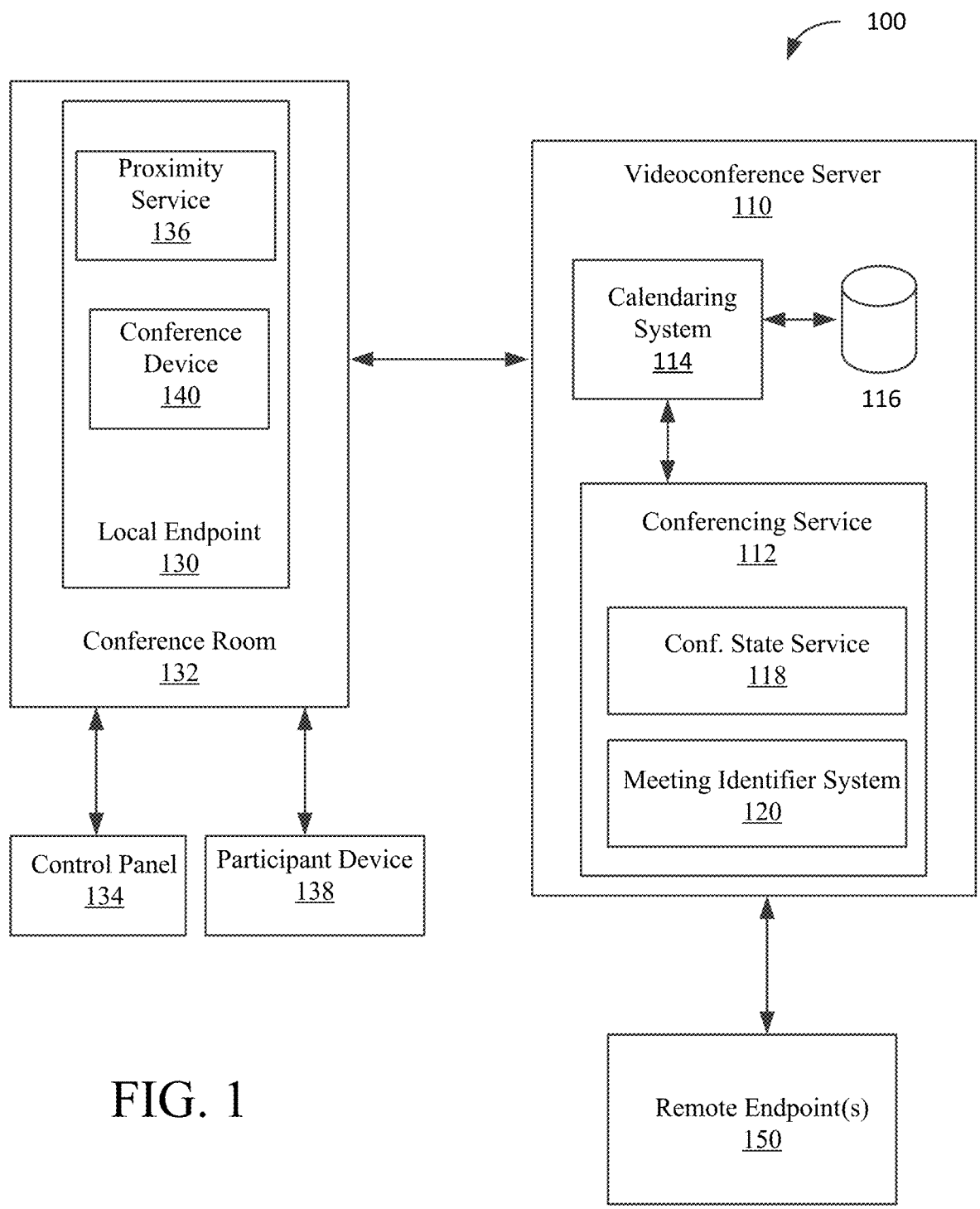
FIG. 1 shows an example conceptual block diagram illustrating an example environment for a videoconference system providing multi-endpoint immersive meeting capabilities, in accordance with various embodiments of the subject technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Overview

Systems, methods, and computer readable mediums are disclosed for securing a meeting in a physical conference room with one or multiple meetings scheduled therein. A videoconference server is configured to host a multi-endpoint conference meeting between a local endpoint associated with the physical conference room and a remote endpoint. In one aspect, a list of scheduled meetings for the physical conference room is received from the videoconference server. A first meeting within the list of scheduled meetings is determined to have been designated as a locked meeting. When the list of scheduled meetings that do not have the locked designation associated with the physical conference room for display are displayed, meeting information for the first meeting is suppressed from that display. Once the presence of a device associated with an entity invited to the first meeting is detected, at least one resource in the physical conference room is unlocked for use in the first meeting when the received meeting identifier is verified.

Detailed Description

The disclosed technology addresses the need in the art for securing conference meetings. When scheduling a meeting within a conference room, the meeting can be set to a protected, or "locked," state. When one of the meeting participants comes in to the conference room, the conference room would initiate a message that prompts the participant to unlock the room for the specific meeting. After confirmation, the participant can operate the meeting, such as viewing meeting detail, starting it, etc. After the participant leaves the room, the listed meeting would automatically lock. Thus, if a non-participant enters the conference room while the meeting is locked, they would be unable to access meeting details or operate the meeting.

A system, method, and computer readable medium is therefore disclosed for securing a meeting in a physical conference room one or multiple meetings scheduled therein. In one aspect, when scheduling a meeting, a user adds a conference room and selects a "Lock Meeting" option that is used to protect the scheduled meeting in the room from accidental operation or disclosing of confidential information outside of a group. After the meeting is scheduled, a videoconference server receives a list of all scheduled meetings for the physical conference room, including meetings within the list designated as locked meetings. The list of one or more scheduled meetings are displayed on a control panel, although the scheduled meetings may be displayed on any device that connects to the local endpoint and/or videoconference server (e.g. a control panel on a table within the conference room). Thus, the control panel can be a wall panel outside the room, or a remote control device on the table, or a display of the endpoint with any type of i/o interface. Meeting information for any locked meetings, however, are suppressed from display. After the presence of a device associated with an entity invited to the meeting (e.g., a participant or host of the meeting) is detected, at least one resource in the physical conference room is unlocked for use in the meeting when a received meeting identifier is verified.

FIG. 1 shows an example conceptual block diagram illustrating an example environment for a videoconference system providing multi-endpoint immersive meeting capabilities, in accordance with various embodiments of the subject technology. System 100 is an embodiment in which a server, such as videoconference server 110, is configured to host a multi-endpoint conference meeting.

In FIG. 1, videoconference server 110 communicates with conference room 132 while hosting a conference meeting. Conference room 132 can be a reserved conference room where a user wishes to keep the identity of whom has reserved the room (and other meeting information, such as title, meeting times, etc.) confidential. In embodiments, conference room 132 includes local endpoint 130. Accordingly, videoconference server 110 can communicate with one or more endpoints through videoconference service 120, such as local endpoint 130 and remote endpoint 150, while hosting a conference meeting, although the conference meeting can be any combination of local and remote endpoints. Local endpoint 130 and remote endpoint 150 can be located at one or more geographic locations, and can include one or more endpoint devices. The endpoint devices can be any device in communication with videoconference service 120, such as mobile phones, laptops, desktops, tablets, conferencing devices installed in a conference room, etc.

Local endpoint 130 is one or more devices located within or proximate to conference room 132, which is a physical conference room in communication with videoconference server 110. Local endpoint 130, as the term is used herein, refers to an endpoint in conference room 132 with at least one control panel 134 located outside conference room 132 (although in some embodiments, control panel 134 is a control panel on a table within conference room 132 that connects to local endpoint 130 and/or videoconference server 110). In some embodiments, multiple conference rooms have a control panel located outside. In those cases, local endpoint 130 refers to an endpoint in a conference room in which its associated control panel receives a user input. Remote endpoint 150, as the term is used herein, receives data that originates from local endpoint 130. While remote endpoint 150 can have an associated control panel of its own, in some embodiments it does not need to have an associated control panel.

In embodiments, local endpoint 130 comprises proximity service 136 that detects the presence of a device associated with an entity invited to a conference meeting (e.g., a participant), such as participant device 138. Participant device 138 can be any device that communicates with local endpoint 130, videoconference server 110, control panel 134, or any combination thereof, such as a mobile phone, laptop, desktop, tablet, etc. Proximity service 136 may, additionally and/or alternatively, determine that a participant invited to a conference meeting is proximate or within conference room 130 by detecting a participant's identity through face recognition, WIFI, Bluetooth, Beacon ID, RFID, etc.

Control panel 134, one or more conference devices (not shown) within conference room 132, or both may be configured to display, among other things, room schedule information, current status of a conference meeting, and/or remote endpoint 150 information. For example, control panel 134 may be configured to interface with a display to provide conferencing session input, such as video and/or audio from remote endpoint 150 participating in a conference meeting. A display input device that takes in user input related to the meeting can communicate the input with videoconference server 110 or local endpoint 130. The display input device may be separate from the display (e.g., as part of control panel 134 and/or an application running on participant device 138) or integrated into the display. The display input device can communicate with videoconference server 110 and/or local endpoint 130 via a Universal Serial Bus (USB) interface, a High-Definition Multimedia Interface (HDMI) interface, a computer display standard interface (e.g., Video Graphics Array (VGA), Extended Graphics Array (XGA), etc.), a wireless interface (e.g., Wi-Fi, infrared, Bluetooth, etc.), or other input or communication medium.

Videoconference server 110 further can comprise conferencing service 112 in communication with calendaring system 114, which can be used to determine scheduling information for local endpoint 130. Local endpoint 130 may be any device located within conference room 132 that communicates with videoconference server 110. Thus, local endpoint 130 may be one device (e.g., control panel 134) or more than one device. For example, local endpoint 130 can include conference device 140 in addition to control panel 134, which is either located within conference room 132 or without, that controls the meeting—such as a device that receives input to initiate/stop a meeting, increase or decrease audio of a display, etc. Thus, assuming local endpoint 130 is located within conference room 132, conference room 132 can be reserved using calendaring system 114. Calendaring system 114, for example, can be configured to identify, for each conference room, an appropriate meeting to start based on the current time, which endpoints are participating in the meeting, and the presence of one or more participants within or proximate to conference room 132.

Calendaring system 114 can, for example, access an electronic calendar stored in scheduling information storage 116 in order to determine whether there is a conference meeting or session scheduled for the current time. The electronic calendar includes a schedule or series of entries for the participant, local endpoint 130 and remote endpoint 150, conference room 132, and any other resource associated with a meeting. Each entry may signify a meeting or collaboration session and its associated room schedule information, including a date and time (e.g., scheduled start times, scheduled end times, etc.), the number and locations of the endpoints participating in the meeting, duration of the meeting, participating endpoints, identities of the participants, locations, reserved conference rooms, or information relating to any other conference resource. Calendaring system 114 can further store a meeting title or a description of the meeting.

During scheduling, one or more conference meetings can be secured or protected in conference room 132, such as by designating the conference meetings as locked. Once designated as locked, all information about the reserved conference meeting can be hidden or omitted from being displayed on control panel 134. As a result, passerby who view control panel 134 (or, similarly, a control device for the local endpoint, such as a control device on a conference table within conference room 132) would be unable to see or otherwise determine any identifying information about the reserved room, thus enabling a user to reserve conference room 132 while keeping the meeting confidential. For example, the user can select a lock option for locking a meeting when the option is presented to the user. Upon an affirmative response to the option (e.g., the user selects the lock option), the option locks at least one resource in conference room 132 (such that the conference meeting cannot be initiated or run) until an authorized participant unlocks conference room 132. Conference room 132 is unlocked when a meeting identifier is received from a meeting participant during a subsequent period of time.

Figure 2A:
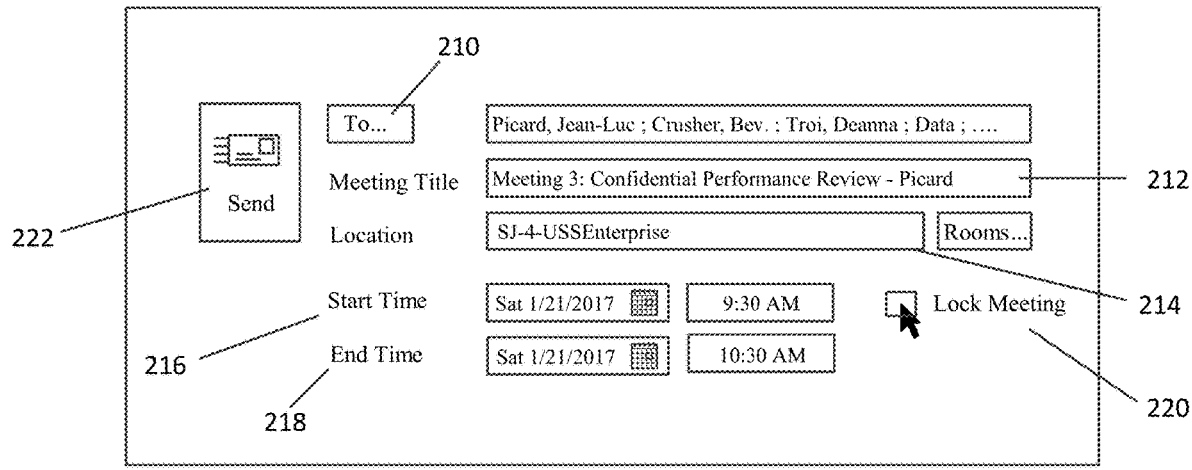
FIG. 2A shows an example user interface for scheduling and designating a meeting as locked.

FIG. 2A shows an example user interface for scheduling and designating a meeting as locked. While some embodiments may automatically lock all meetings unless otherwise unlocked, other embodiments require the meeting to be designated as locked before it is suppressed from display. For example, when a user, such as a meeting host or a participant schedules a conference meeting, the user interface can present one or more user interface elements that allow the user to input invited participants 210. Invited participants 210 can be any information specifying the identities of the individual participants, such as their names, email addresses, avatars, etc. The user can furthermore add a meeting title 212, location 214 (such as endpoints in the conference meeting and/or participating conference rooms), start times 216, end times 218, and/or meeting duration (not shown). To secure the meeting from unauthorized access or display, the user can designate the meeting as locked by selecting lock option 220. Here, lock option 220 is labeled "Lock Meeting", but any label that specifies the meeting is meant to be confidential or secured can be used. The lock option 220 selection specifies that the scheduled meeting is a secured meeting that requires an authorized participant to unlock the meeting before meeting details can be viewed at control panel 134 (or control device connected to an endpoint within the room).

Meeting host then sends 222 the scheduled meeting to videoconference server 110, which stores the scheduled meeting information on scheduling information storage 116 (whether lock option 220 is selected or not).

Figure 2B:
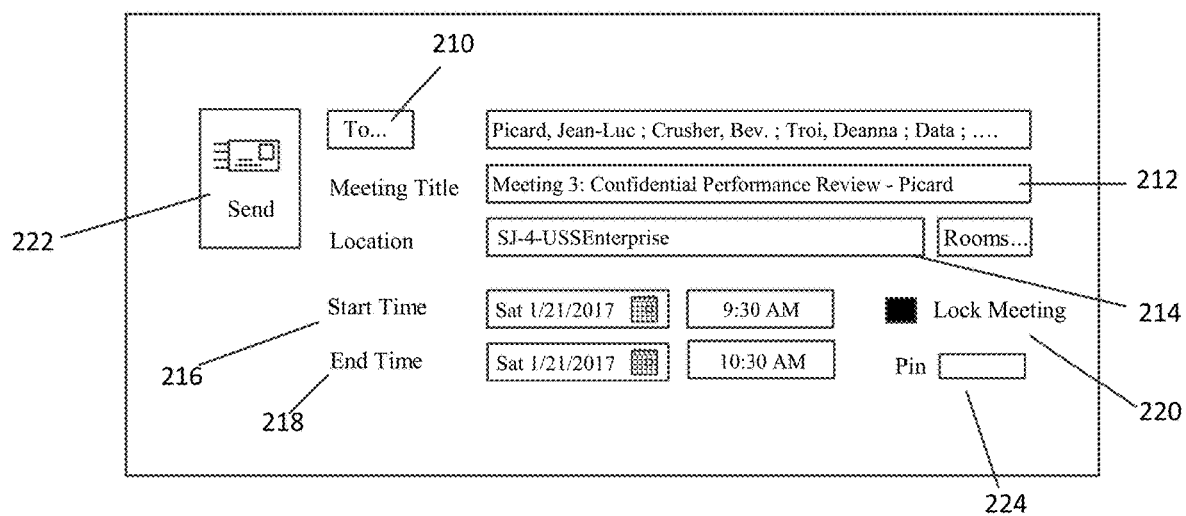
FIG. 2B shows an example user interface for generating a meeting identifier associated with a locked meeting.

Assuming the user has selected lock option 220, FIG. 2B shows an example user interface for generating one or more meeting identifiers 224 associated with lock option 220. If conference room 132 supports secure meetings, and after the meeting host selects lock option 220, one or more user interface elements asking for meeting identifier 224 input can be presented to the user. Meeting identifier 224 can be a pin number that the user chooses and inputs into the user interface, although any identifier can be used so long as it is recognized as being associated with the scheduled meeting (e.g., can be a password, email, username, etc.). While FIG. 2B shows that meeting identifier 224 is presented after the user selects lock option 220, alternative embodiments may display meeting identifier 224 during the entire scheduling process, whether lock option 220 has been selected or not.

Conferencing service 112 accordingly receives from calendaring system 114 meeting schedules, an indication of whether the user selected lock option 220 for each meeting, and/or meeting identifiers 224 for each meeting. Conferencing state service 118 determines, based on the received information, which conference meetings have been designated as locked meetings and which have not, and instructs conferencing service 112 to facilitate meetings accordingly. Meeting schedules and information associated with conference room 132 is then transmitted to local endpoint 130 prior to or during a scheduled meeting.

Control panel 134 or other similar control device (e.g., a display of the endpoint with any type of i/o interface, such as a wall panel outside the room or a remote control device on the table) can receive scheduling information directly from videoconference server 110 and/or from local endpoint 130 in communication with videoconference server 110. Control panel 134 uses the scheduling information to display on control panel display 300 the list of scheduled meetings that do not have the locked designation associated with conference room 132. FIG. 3 shows such an example display. In embodiments disclosed by FIG. 3, control panel display 300 displays, for each scheduled meeting associated with conference room 132 without a lock designation, its meeting title 310 and meeting time 320. As a result, Meeting 1 ("Engine Op. Biweekly Team"), Meeting 2 ("Holodeck Board"), and Meeting 5 ("Warp Calibration Group") are meetings whose user did not select lock option 220, and accordingly their information is freely displayed. However, the user for Meeting 3 ("Confidential Performance Review—Picard") and Meeting 4 ("Confidential Performance Review—Kirk") selected lock option 220 during scheduling, and thus control panel display 300 fails to or suppresses from displaying any meeting information for those meetings, such as meeting title 310 or meeting time 320 for Meetings 3 and 4.

In some embodiments, control panel display 300 (or other type of control device for the local endpoint) displays only one meeting. Thus, rather than displaying the entire list of scheduled meetings, control panel display 300 displays a current meeting or the next meeting some period of time before its scheduled start time. For example, if Meeting 1: Engine Op. Biweekly Team is scheduled to start at 7:00 am, when the clock reaches 6:55 am (e.g., 5 minutes before) then control panel display 300 displays the upcoming meeting and/or some way to join/initiate the meeting. For example, at 6:55 control panel display 300 can display a button to push to join or the user can initiate the meeting through voice activation (e.g., by saying "hey Spark, join meeting"). These join meeting options are not displayed before the system detects that an invited person is in the room (via e.g. proximity of the mobile phone or face detection).

Figure 4:
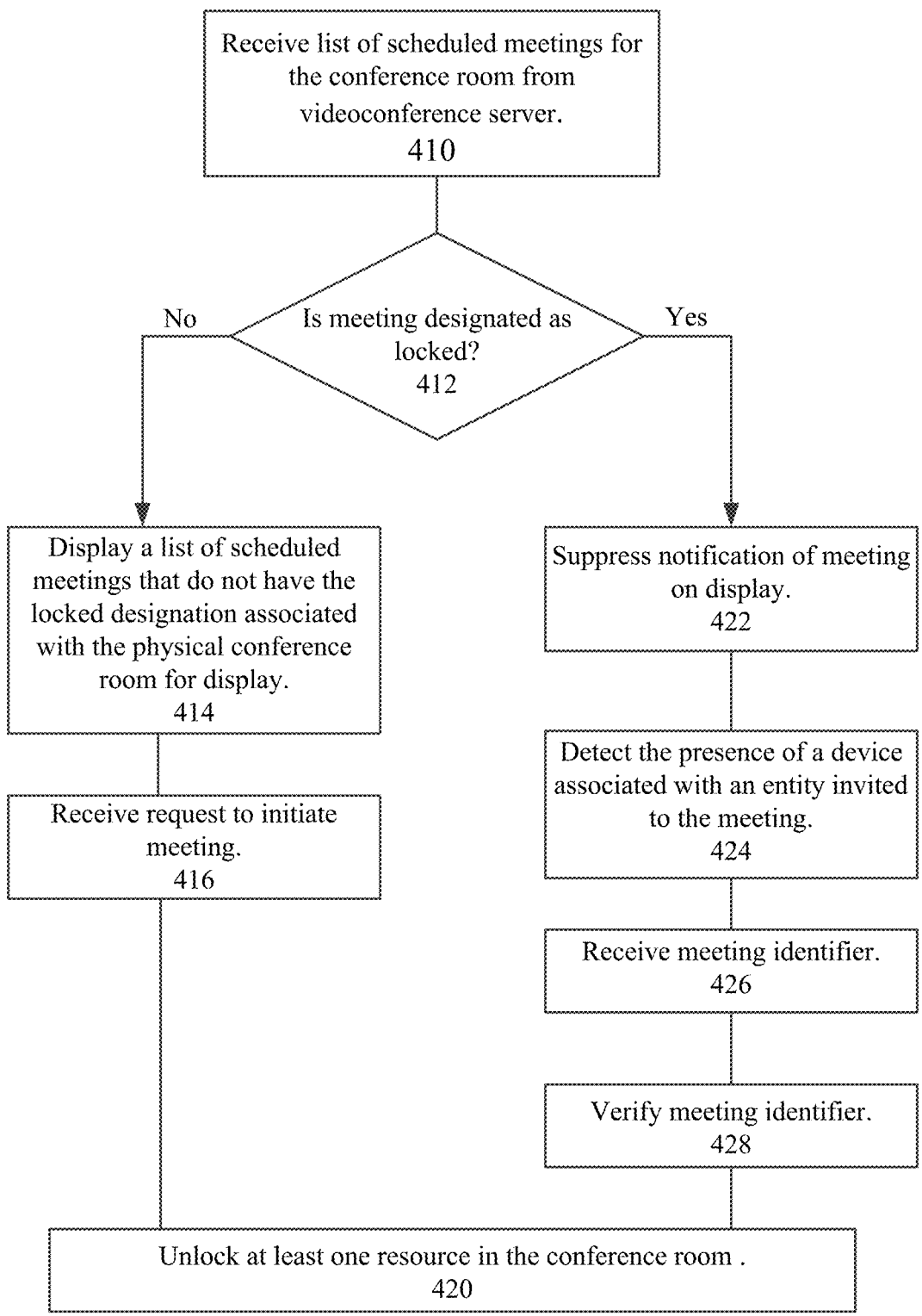
FIG. 4 shows a flowchart illustrating an exemplary method for securing a meeting in a physical conference room with multiple meetings scheduled.

FIG. 4 shows a flowchart illustrating an exemplary method for securing a meeting in a physical conference room with multiple meetings scheduled. Prior to or during a scheduled meeting, local endpoint 130 is configured to receive a list of scheduled meetings for the associated physical conference room (e.g., conference room 132) from videoconference server 110 (step 410).

For scheduled meetings without the locked designation associated with conference room (step 412), control panel 134 freely displays a list of those scheduled meetings (step 414). Control panel 134 and/or participant device 138 can thereafter receive input from the host or another participant that requests initiation of the scheduled meeting (step 416), which is then sent to conferencing service 112. Once the request has been received by conferencing service 112 (and in some embodiments checked by conferencing state service 118 to make sure the meeting has not been secured), conferencing service 112 sends instructions to local endpoint 130 to unlock at least one resource in conference room 132 (step 420). Thus, the meeting can be operated by anyone within the room and/or with access to control panel 134.

However, if one or more meetings within the list of scheduled meetings has been designated as a locked meeting (step 412), then control panel 134 only displays the list of scheduled meetings without the locked designation. Meeting information for any locked meetings is suppressed from display (step 422). In some embodiments locked meetings can be represented by showing that a generic meeting is scheduled in the conference room, without any identifying information other than the time at which the meeting is scheduled.

Figure 5:
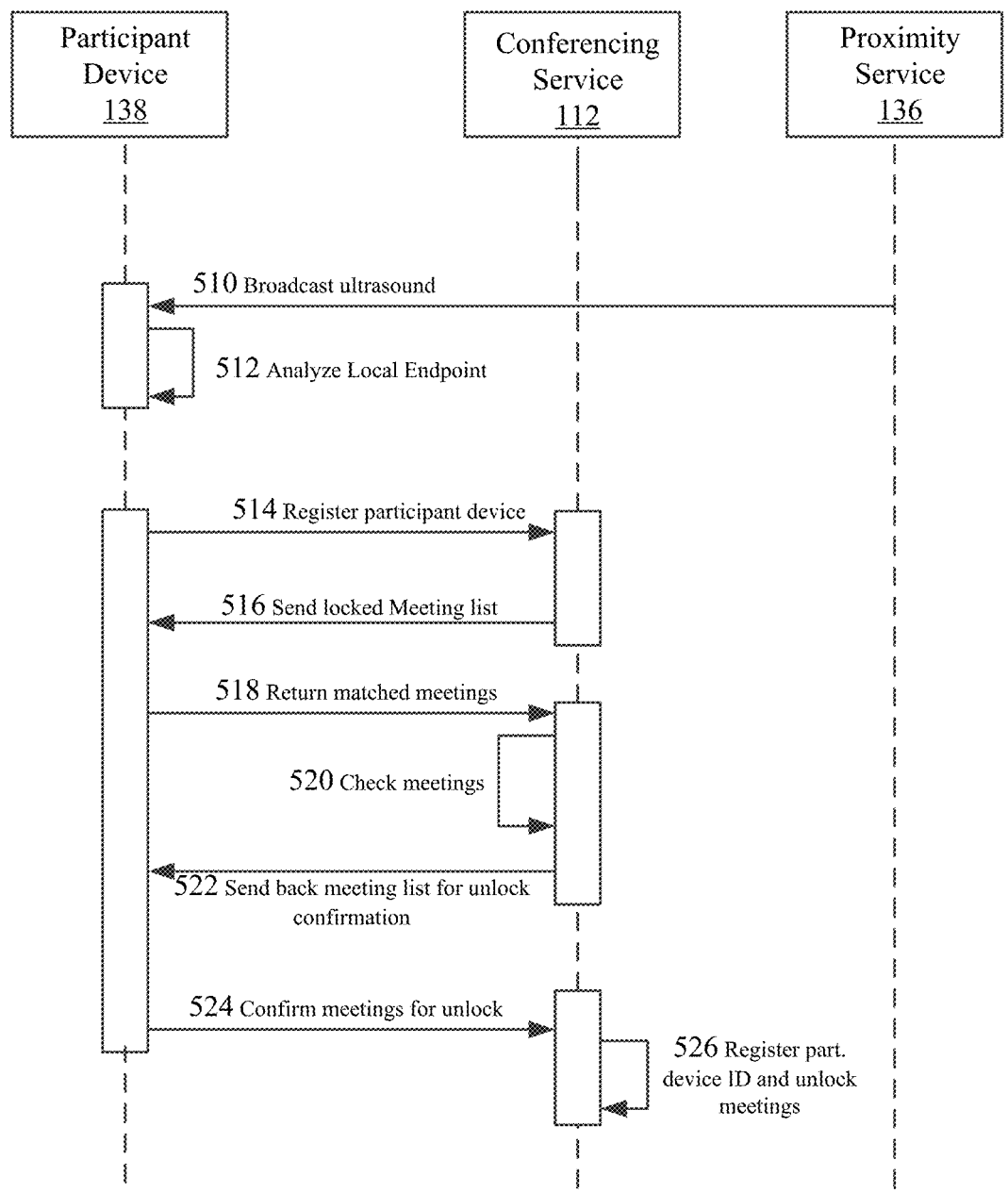
FIG. 5 shows an example diagram of unlocking at least one resource in a physical room for use in a meeting.

Locked meetings, however, can be unlocked by the host or other authorized participants. With reference to FIG. 5, which shows an example diagram of unlocking a physical room reserved for a meeting, proximity service 136 detects the presence of a device associated with a meeting participant invited to the conference meeting. For example, proximity service 136 broadcasts a signal, such as ultrasound, that is enabled to communicate with participant device 138 when participant device 138 enters conference room 132 (510). The presence of participant device 138, which can be a laptop, mobile, or other meeting device, indicates that the participant associated with the device is within the room. Thus, conference room 132 can use the participant device 138 to determine that not only that the device has entered the physical conference room, but also the identity of the participant and any meetings that the participant has scheduled or been invited to in conference room 132. In some embodiments, once participant device 138 has been detected, conference room 132 can display all or a portion of the participants currently present within the room.

The ultrasound broadcast can transmit local endpoint information to participant device 138, which then analyzes and connects to local endpoint 130 (512). Conferencing service 112 can then register participant device 138 once the participant has been recognized (514). Registration of participant device 138 can trigger conferencing service 112 to send a locked meeting list the participant has been invited to (or is hosting) to participant device 138 (516). Participant device 138 can request to initiate one or more meetings within the locked meeting list, and so any matched meetings are returned to conferencing service 112 (518) along with the requests (step 424). Meeting identifier system 120 checks the matched meetings (520) and sends back meeting list for unlock confirmation (522).

Based on participant device 138 entering conference room 132 and requesting to initiate the meeting, conferencing service 112 can present an option on participant device 138 (or on control panel 134, not shown) to unlock the meeting. This can be done by confirming which meetings are to be unlocked (524).

Figure 6:
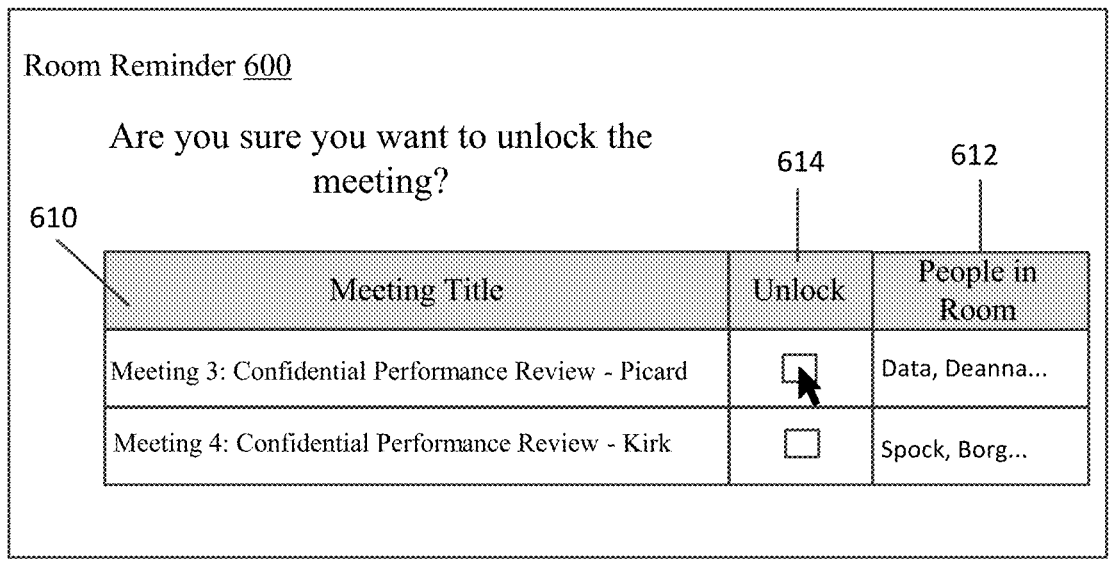
FIG. 6 shows an example user interface for unlocking a secure meeting.

Referring to FIG. 6, which shows an example user interface for unlocking a secure meeting, room reminder 600 can be sent to participant device 138, asking the participant if they want to unlock the meeting. Matched meetings are then displayed to the participant for unlocking on participant device 138, including secured meeting information such as the locked meeting's title 610, start time, end time, etc. In some embodiments, one or more participants located in conference room 132 are recognized, either through device detection or automatic facial recognition, once the meeting has started. Identifying information 612 of the one or more currently attending participants are displayed on each device of the participant connected to the meeting. Unlock option 614 can be presented to at least one of the participants, where a selection of the unlock option 614 and verification of a received meeting identifier unlocks at least one resource in conference 132 room for use in the meeting (526).

One or more invited participants can input a meeting identifier in order to confirm meeting unlocking. In some embodiments, meeting identifier 224 can be received at control panel 134, which communicates with local endpoint 130 and/or conferencing service 112 to confirm meeting unlock (step 426). In other embodiments, meeting identifier 224 can be received from participant device 138, which then communicates with local endpoint 130 and/or conferencing service 112 to confirm meeting unlock (step 426). Meeting identifier 224 can be unique to one or more calendar invitations specific to the meeting (e.g., can either be different for each participant or can be unique for each meeting), and can be verified by meeting identifier system 120 (step 428). Once meeting identifier 224 has been verified by meeting identifier system 120, one or more resources in conference room 132 are unlocked (step 420).

Figure 7:
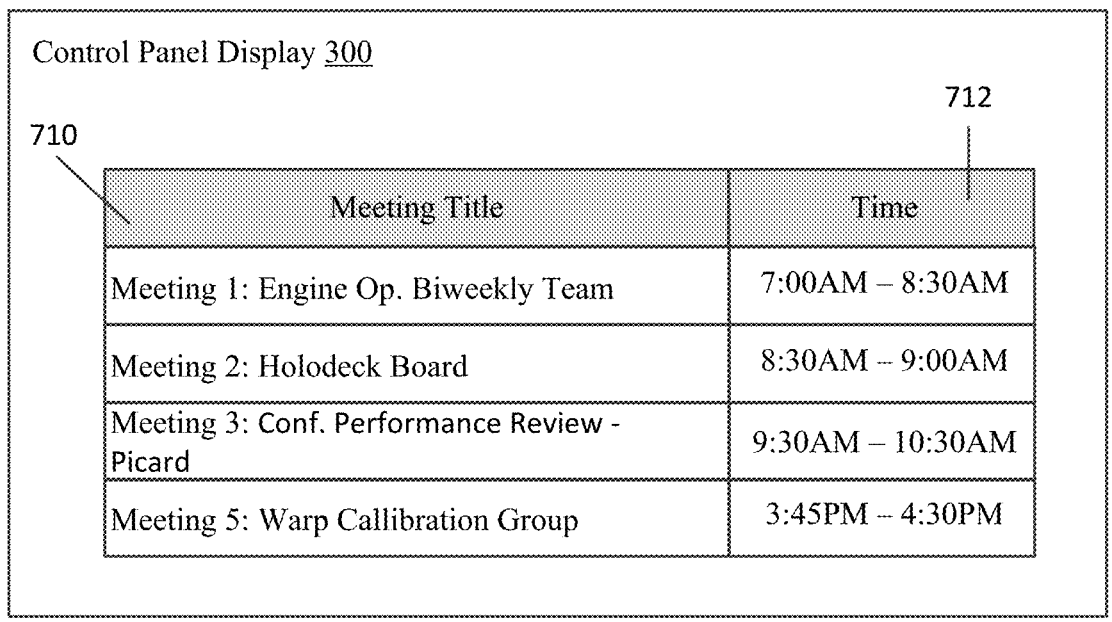
FIG. 7 shows an example display for displaying a list of scheduled meetings after a secure meeting has been unlocked.

In some embodiments, locked meeting information is never displayed on control panel 134, regardless of whether it has been unlocked or not. In alternative embodiments, however, after the participant selects unlock option 614 and the meeting identifier 224 is verified, the formerly locked meeting and its associated information can be displayed on control panel 134. FIG. 7 shows an example display of displaying a list of scheduled meetings after a secure meeting has been unlocked. In this example, Meeting 3 "Confidential Performance Review—Picard" has been unlocked (see FIG. 6) (while Meeting 4: "Confidential Performance Review—Kirk" remains locked). Meeting 3 information, which was formerly suppressed from display, now shows up on control panel display 300. Further information about the secure meeting can also be displayed after unlocking, such as meeting title 710 and meeting time 712. However, while an authorized participant of the meeting can re-designate meetings to be unlocked, any other meetings that are designated as locked remain locked and suppressed from display.

Figure 8:
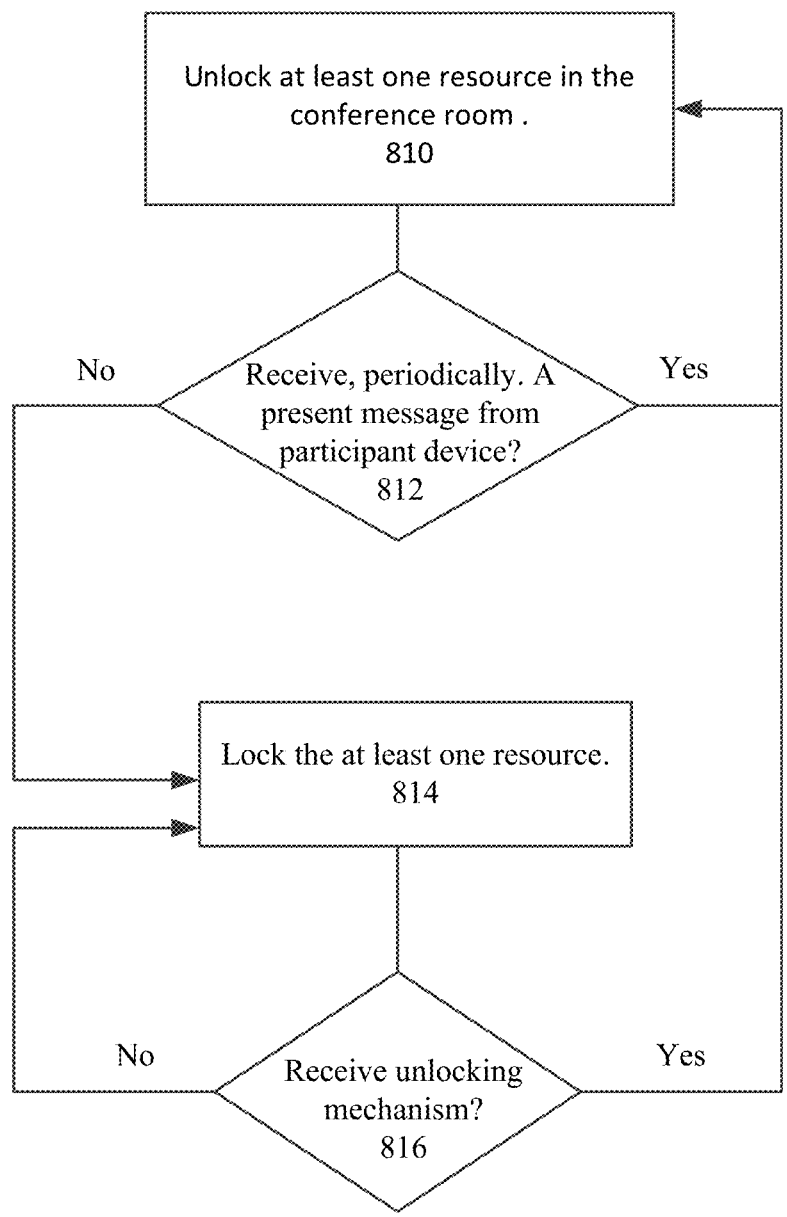
FIG. 8 shows a flowchart illustrating an exemplary method for locking a meeting when a participant leaves the physical conference room.
Figure 9:
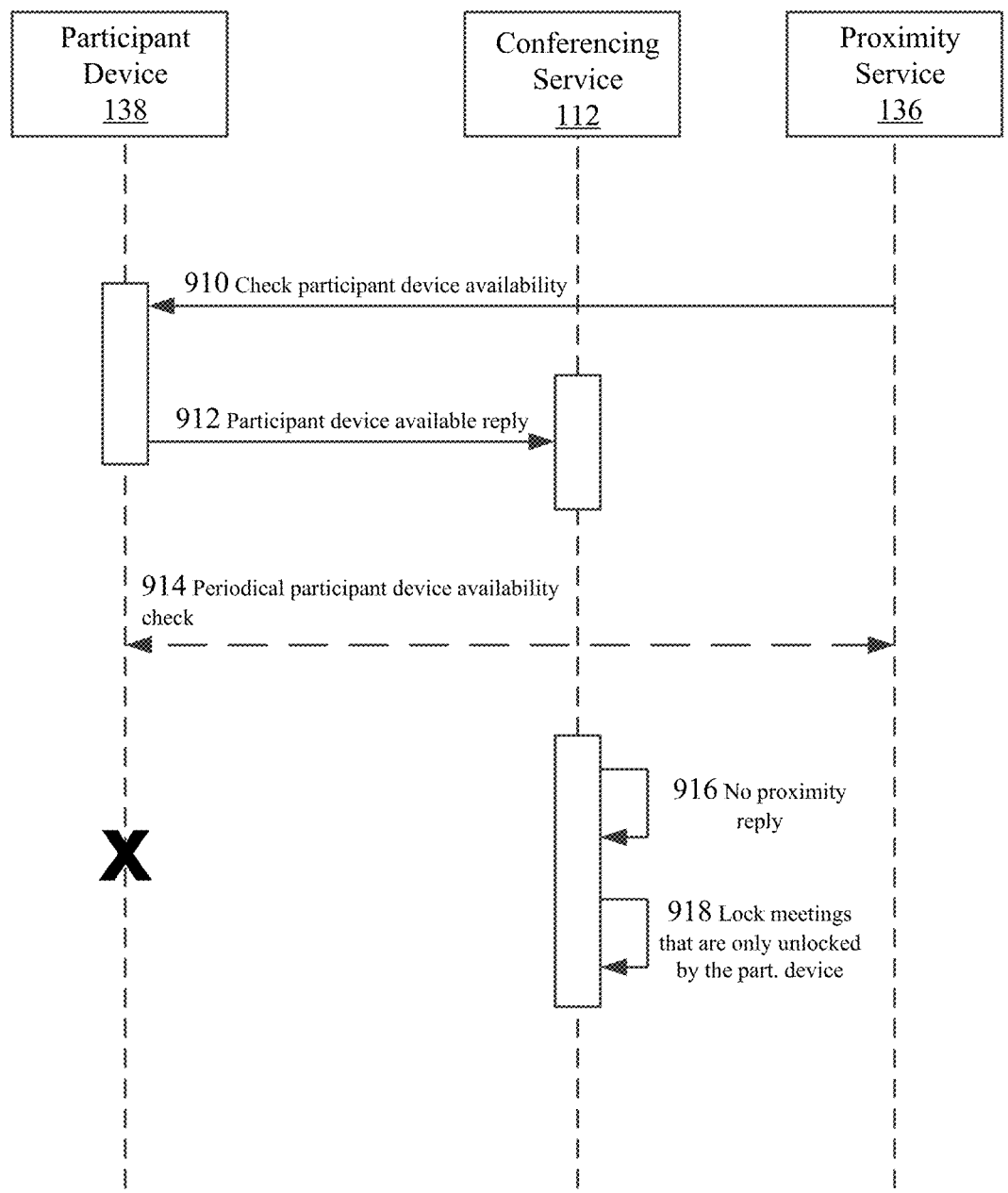
FIG. 9 shows an example diagram for locking a meeting when a participant leaves the physical conference room.

In some meetings, the meetings are unlocked only as long as the participant is within conference room 132. As soon as the participant leaves, the meeting can automatically lock itself again to prevent unauthorized operation. FIG. 8 shows a flowchart illustrating an exemplary method for locking a meeting when a participant leaves the physical conference room, and FIG. 9 shows an example diagram for locking that meeting when the participant leaves. After unlocking at least one resource in conference room 132 (step 810), proximity service 136 checks participant device availability (910). In embodiments, proximity service 136 checks periodically and/or continuously, although in other embodiments, proximity service 136 can check for participant device availability in response to a predetermined event or trigger. If participant device 138 replies (912) that it is available and/or periodically transmits a present message (e.g., the device confirms or informs proximity service 136 that it is located within conference room 132) (step 812), then the at least one resource remains unlocked.

However, if proximity service 136 sends an availability check that goes unanswered by participant device 138 (914), conferencing service 112 notes or flags that there was no proximity reply (916). In response to not receiving a proximity reply, conferencing service 112 then locks any meetings that were unlocked by participant device 138 (918). Thus, after failing to receive the present message from participant device 138 within a predetermined period of time, at least one resource of the meeting is locked against unauthorized use from a non-participant and the meeting remains secured (step 814).

If participant device 138 thereafter re-enters conference room 132, the participant may unlock the meeting through room reminder interface 600. If the unlocking mechanism is received and verified (step 816), then at least one resource in conference room 132 is unlocked for use. Otherwise, the at least one resource in conference room 132 remains locked. Thus, scheduled meetings remain secured and protected from non-participants throughout the entirety of the meeting.

Figure 10:
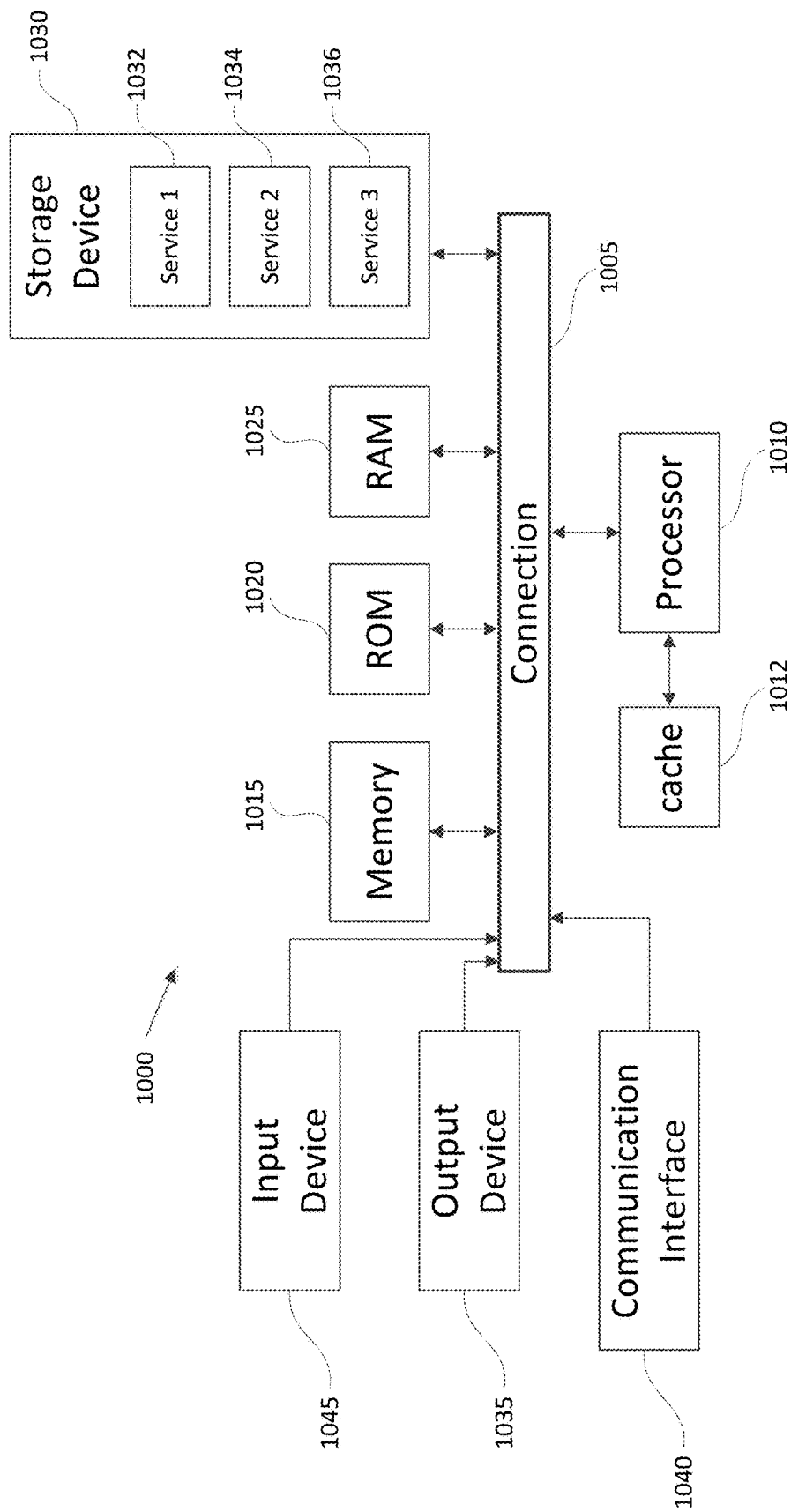
FIG. 10 shows an example of a system for implementing certain aspects of the present technology.

FIG. 10 shows an example of computing system 1000 in which the components of the system are in communication with each other using connection 1005. Connection 1005 can be a physical connection via a bus, or a direct connection into processor 1010, such as in a chipset architecture. Connection 1005 can also be a virtual connection, networked connection, or logical connection.

In some embodiments computing system 1000 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read only memory (ROM) and random access memory (RAM) to processor 1010. Computing system 1000 can include a cache of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement and therefore the basic features here may easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for securing a videoconference in a physical conference room through a control panel that controls the videoconference, the method comprising:
receiving at least one scheduled videoconference meeting for the physical conference room from a videoconference server, the videoconference server configured to host a multi-endpoint videoconference meeting between a local endpoint associated with the physical conference room and a remote endpoint;
determining that a first videoconference meeting within the at least one scheduled videoconference meeting has been designated as a locked meeting; in response to the determining:
suppressing display on the control panel of meeting information for the first videoconference meeting;
lock out access to the first videoconference meeting through the control panel, such that the first videoconference meeting cannot be joined from within the physical conference room while the lock out is maintained;
detecting within the physical conference room a device associated with an entity invited to the first videoconference meeting;
suspending, in response to the detecting, the suppressing display such that the meeting information for the first videoconference meeting is displayed on the control panel;
suspending the lock out of the control panel to permit joining of the first videoconference meeting in response to the detecting and subsequent verification of a received meeting identifier;
joining the first videoconference meeting during the suspending; and resuming the lock out after failing to detect the device for a predetermined period of time;
wherein the suppressing display and the lock out do not apply to a videoconference that is designated as unlocked.

2. The method of claim 1, wherein the suspending the suppressing display includes displaying the first videoconference meeting on the control panel.

3. The method of claim 1, wherein the detecting the device associated with the first videoconference meeting includes receiving the meeting identifier identifying a calendar invitation specific to the first videoconference meeting from the device.

4. The method of claim 1, the method further comprising:
periodically receiving a present message from the device; and
the resuming of the lock out is in response to failure to receive the present message from the device within a predetermined period of time.

5. The method of claim 1, further comprising:
in response to the detecting, presenting an option on the device to unlock the first videoconference meeting.

6. The method of claim 1, wherein the meeting identifier is received from the control panel in communication with the local endpoint associated with the physical conference room.

7. The method of claim 1, wherein an authorized participant of the first videoconference meeting designates the first videoconference meeting as unlocked, wherein meeting information for the first videoconference meeting is displayed, and a second videoconference meeting designated as locked remains locked and suppressed from display.

8. The method of claim 7, wherein the authorized participant is a host of the first videoconference meeting.

9. The method of claim 1, comprising:
presenting an option to designate the first videoconference meeting as a locked meeting; and
upon an affirmative response to the option, prompting for input of a meeting identifier configured to unlocking at least one resource in the physical conference room for use in the first videoconference meeting when the received meeting identifier is received during a subsequent period of time.

10. The method of claim 1, further comprising recognizing one or more participants located in the physical conference room once the first videoconference meeting has started, and wherein identifying information of the one or more participants are displayed on each device of the participant connected to the first videoconference meeting.

11. At least one non-transitory computer readable medium comprising instructions that when executed cause at least one computing device to perform operations comprising:
receiving at least one scheduled videoconference meeting for a physical conference room from a videoconference server, the videoconference server configured to host a multi-endpoint videoconference meeting between a local endpoint associated with the physical conference room and a remote endpoint the physical conference room having a control panel that controls the videoconference meeting;
determining whether a first videoconference meeting within the at least one scheduled videoconference meeting has been designated as a locked meeting; in response to the determining:
suppress display on the control panel of meeting information for the first videoconference meeting;
lock out access to the first videoconference meeting through the control panel within the physical conference room, such that the first videoconference meeting cannot be joined from within the physical conference room while the lock out is maintained;
detecting within the physical conference room a device associated with an entity invited to a first videoconference meeting;
suspending, in response to the detecting, the suppressing display such that the meeting information for the first videoconference meeting is displayed on the control panel;
suspending the lock out of the control panel to permit joining of the first videoconference meeting in response to the detecting and subsequent verification of a received meeting identifier;
joining the first videoconference meeting during suspending of the lock out; and
resuming the lock out after failing to detect the device for a predetermined period of time;

wherein the suppressing display and the lock out do not apply to a video conference that is designated as unlocked.

12. The at least one non-transitory computer-readable medium of claim 11, wherein the suspending the suppressing display includes displaying the first videoconference meeting on the control panel.

13. The at least one non-transitory computer-readable medium of claim 11, wherein the detecting the device associated with the first videoconference meeting includes receiving the meeting identifier identifying a calendar invitation specific to the first videoconference meeting from the device.

14. The at least one non-transitory computer-readable medium of claim 11, the operations further comprising:
  periodically receiving a present message from the device; and
  the resuming of the lock out is in response to failure to receive the present message from the device within a predetermined period of time.

15. The at least one non-transitory computer-readable medium of claim 11, wherein the instructions further cause the at least one computing device to:
  determining that a device of the participant has entered the physical conference room; and
  generating a notification for display on the device that presents an option to unlock the first videoconference meeting.

16. The at least one non-transitory computer-readable medium of claim 11, wherein the meeting identifier is received from the control panel in communication with the local endpoint associated with the physical conference room.

17. The at least one non-transitory computer-readable medium of claim 11, wherein an authorized participant of the first videoconference meeting re-designates the first videoconference meeting as unlocked, and a second videoconference meeting designated as locked remains locked and suppressed from display.

18. A system comprising:
  a videoconference server configured to host a multi-endpoint conference meeting; and
  a local endpoint associated with a physical conference room in communication with the videoconference server, the local endpoint configured to perform operations comprising:
  receiving at least one scheduled videoconference meeting for a physical conference room from a videoconference server, the videoconference server configured to host a multi-endpoint video conference meeting between a local endpoint associated with the physical conference room and a remote endpoint;
  determining whether a first videoconference meeting within the at least one scheduled videoconference meeting has been designated as a locked meeting; in response to the determining:
  suppressing display on a control panel of meeting information for the first videoconference meeting;
  lock out access to the first videoconference meeting through the control panel within the physical conference room, such that the first videoconference meeting cannot be joined from within the physical conference room while the lock out is maintained;
  detecting within the physical conference room a device associated with an entity invited to the first videoconference meeting;
  suspending, in response to the detecting, the suppressing display such that the meeting information for the first videoconference meeting is displayed on the control panel;
  suspending the lock out of the control panel to permit joining of the first videoconference meeting in response to the detecting and subsequent verification of a received meeting identifier;
  joining the first videoconference meeting during suspending of the lock out; and
  resuming the lock out after failing to detect the device for a predetermined period of time;
  wherein the suppressing display and the lock out do not apply to a video conference that is designated as unlocked.

* * * * *